US011803999B2

(12) United States Patent
Perry et al.

(10) Patent No.: US 11,803,999 B2
(45) Date of Patent: Oct. 31, 2023

(54) JOB SCHEDULING USING REINFORCEMENT LEARNING

(71) Applicants: ADVANCED MICRO DEVICES, INC., Santa Clara, CA (US); ATI TECHNOLOGIES ULC, Markham (CA)

(72) Inventors: Thomas Daniel Perry, Bellevue, WA (US); Steven Tovey, Milton Keynes (GB); Mehdi Saeedi, Markham (CA); Andrej Zdravkovic, Markham (CA); Zhuo Chen, Markham (CA)

(73) Assignees: Advanced Micro Devices, Inc., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 17/529,916

(22) Filed: Nov. 18, 2021

(65) Prior Publication Data

US 2023/0154100 A1 May 18, 2023

(51) Int. Cl.
*G06T 15/00* (2011.01)
*G06F 9/48* (2006.01)
*G06N 20/00* (2019.01)

(52) U.S. Cl.
CPC .......... *G06T 15/005* (2013.01); *G06F 9/4881* (2013.01); *G06N 20/00* (2019.01)

(58) Field of Classification Search
None
See application file for complete search history.

(56) References Cited

U.S. PATENT DOCUMENTS

| 2017/0364829 | A1* | 12/2017 | Fyffe | G06N 3/006 |
| 2022/0121968 | A1* | 4/2022 | Chandak | G06N 3/006 |
| 2022/0197306 | A1* | 6/2022 | Celia | G06N 3/006 |
| 2023/0176847 | A1* | 6/2023 | Ben-Moshe | G06F 8/65 |
| | | | | 717/168 |

OTHER PUBLICATIONS

Mathworks, "What is Reinforcement Learning", 2023, retrieved from "https://www.mathworks.com/discovery/reinforcement-learning.html" (Year: 2023).*

* cited by examiner

*Primary Examiner* — Michael J Cobb

(57) ABSTRACT

Systems, methods, and techniques utilize reinforcement learning to efficiently schedule a sequence of jobs for execution by one or more processing threads. A first sequence of execution jobs associated with rendering a target frame of a sequence of frames is received. One or more reward metrics related to rendering the target frame are selected. A modified sequence of execution jobs for rendering the target frame is generated, such as by reordering the first sequence of execution jobs. The modified sequence is evaluated with respect to the selected reward metric(s); and rendering the target frame is initiated based at least in part on the evaluating of the modified sequence with respect to the one or more selected reward metric(s).

22 Claims, 7 Drawing Sheets

```
105
enable  %oven
xor     %tray, %tray
add     %tray, %butter
scatter %tray, %butter
xor     %bowl, %bowl
add     %bowl, %butter
add     %bowl, %flour
add     %bowl, %eggs
add     %bowl, %sugar
permute %bowl
add     %tray, %bowl
add     %oven, %tray
waitcnt %oven
```

JOB SCHEDULING USING REINFORCEMENT LEARNING

BACKGROUND

Scheduled execution of processing jobs, including handling and execution of graphical shader jobs, is generally associated with some degree of flexibility. In particular, although such jobs are typically associated with various hard data dependencies to be accommodated and preserved, scheduling such jobs is often associated with a combinatorial explosion of potential solutions, such as those associated with the scheduling of a sequence of shader jobs for one or more frames to be rendered as part of an application or game. However, previous attempts to optimize a schedule in the face of this resulting large quantity of potential solutions have been associated with significant quantities of time and computational resources.

Thus, there is a need for a solution for optimization or near-optimization of scheduling individual jobs in a multi-threaded execution environment without using a factorially complex exhaustive search, or sub-optimal heuristic approaches.

BRIEF SUMMARY OF EMBODIMENTS

Embodiments are described herein in which reinforcement learning is used to efficiently schedule a sequence of jobs for execution by one or more processing threads. A first sequence of execution jobs associated with rendering a target frame of a sequence of frames is received. One or more reward metrics related to rendering the target frame are selected. A modified sequence of execution jobs for rendering the target frame is generated, such as by reordering the first sequence of execution jobs. The modified sequence is evaluated with respect to the selected reward metric(s), and rendering the target frame is initiated based at least in part on the evaluating of the modified sequence with respect to the one or more selected reward metric(s).

In certain embodiments, a method of execution job scheduling in a computing system may include receiving a first sequence of execution jobs associated with rendering a target frame of a sequence of frames, each execution job including one or more processor-executable instructions; selecting one or more reward metrics related to rendering the target frame; generating a modified sequence of execution jobs for rendering the target frame by reordering the first sequence of execution jobs; evaluating the modified sequence with respect to the one or more selected reward metrics; and based at least in part on the evaluating of the modified sequence with respect to the one or more selected reward metrics, initiating rendering the target frame using the modified sequence of execution jobs.

The method may further include retrieving a stored policy associated with an application generating the sequence of frames, such that selecting the one or more reward metrics includes selecting the one or more reward metrics based at least in part on the stored policy. The method may further include modifying the stored policy associated with the application based at least in part on the evaluating of the modified sequence with respect to the one or more selected reward metrics.

Selecting the one or more reward metrics may include selecting the one or more reward metrics based at least in part on a rendering of one or more previous frames of the sequence of frames.

Selecting the one or more reward metrics may include selecting the one or more reward metrics from a plurality of tracked performance metrics related to rendering the target frame.

The one or more selected reward metrics may include one or more of: a time to render the target frame; a time difference between rendering the target frame and rendering one or more previous frames of the sequence of frames; a quantity of state transitions associated with rendering the target frame; or a quantity of compute barriers associated with the rendering of the target frame.

Reordering the first sequence of execution jobs based at least in part on the determined one or more performance metrics may include generating a render graph representation of the first sequence of execution jobs.

Generating the render graph representation of the first sequence of execution jobs may include inferring one or more data dependencies from the first sequence of execution jobs.

Receiving the first sequence of execution jobs may include receiving a render graph representation of the first sequence of execution jobs.

Generating the modified sequence may include generating an iterative modified sequence of execution jobs via reinforcement learning based at least in part on the evaluating of the modified sequence with respect to the one or more selected reward metrics, such that initiating execution of the modified sequence includes initiating execution of the iterative modified sequence.

In certain embodiments, a processing system may include one or more processors, each processor having one or more processing cores; one or more memories; and at least one rendering pipeline scheduler. Each rendering pipeline scheduler may be, with respect to one or more rendering pipelines of the processing system, to receive a first sequence of execution jobs associated with rendering a target frame of a sequence of frames such that each execution job includes one or more processor-executable instructions; to select one or more reward metrics related to rendering the target frame; to generate a modified sequence of execution jobs for rendering the target frame, such that to generate the modified sequence includes to reorder the first sequence of execution jobs; to evaluate the modified sequence with respect to the one or more selected reward metrics, and to initiate a rendering of the target frame using the modified sequence of execution jobs based at least in part on the evaluation of the modified sequence with respect to the one or more selected reward metrics.

At least one of the one or more processors may be a graphics processing unit (GPU).

The at least one rendering pipeline scheduler may further be to retrieve a stored policy associated with an application generating the sequence of frames, such that to select the one or more reward metrics may include to select the one or more reward metrics based at least in part on the stored policy. The at least one rendering pipeline scheduler may further be to modify the stored policy associated with the application based at least in part on the evaluation of the modified sequence with respect to the one or more selected reward metrics.

To select the one or more reward metrics may include to select the one or more reward metrics based at least in part on a rendering of one or more previous frames of the sequence of frames.

To select the one or more reward metrics may include to select the one or more reward metrics from a plurality of tracked performance metrics related to rendering the target frame.

The one or more selected reward metrics may include one or more of: a time to render the target frame; a time difference between rendering the target frame and rendering one or more previous frames of the sequence of frames; a quantity of state transitions associated with rendering the target frame; or a quantity of compute barriers associated with the rendering of the target frame.

To reorder the first sequence of execution jobs may include to generate a render graph representation of the first sequence of execution jobs. To generate the render graph representation of the first sequence of execution jobs may include inferring one or more data dependencies from the first sequence of execution jobs.

To receive the first sequence of execution jobs may include to receive a render graph representation of the first sequence of execution jobs.

The at least one rendering pipeline scheduler may include reinforcement learning to generate an iterative modified sequence of execution jobs based at least in part on the evaluation of the modified sequence with respect to the one or more selected reward metrics, such that to initiate execution of the modified sequence jobs includes to initiate execution of the iterative modified sequence.

In certain embodiments, a non-transitory computer-readable medium may store instructions that, when executed, cause one or more hardware processors to receive a first sequence of execution jobs associated with rendering a target frame, each execution job including one or more processor-executable instructions; to select one or more reward metrics for use in rendering the target frame; to generate a modified sequence of execution jobs for rendering the target frame, such that to generate the modified sequence includes to reorder the first sequence of execution jobs; to evaluate the modified sequence with respect to the one or more selected reward metrics; and, based at least in part on evaluation of the modified sequence with respect to the one or more selected reward metrics, to initiate the modified sequence of execution jobs to render the target frame.

The stored instructions may further cause the one or more hardware processors to retrieve a stored policy associated with an application generating the target frame, and to select the one or more reward metrics may include to select the one or more reward metrics based at least in part on the stored policy.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
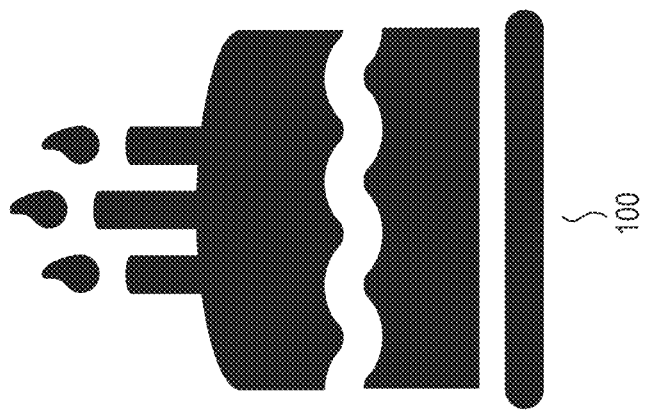
FIG. 1 illustrates a series of pseudo-instructions in accordance with one or more embodiments.

Job scheduling (the process of allocating processor and/or other resources to many different tasks, each including one or more lines of executable instruction code), is a complex problem, particularly for a graphical shader. Brute force solutions for job scheduling typically involve a combinatorial explosion of potential solutions and are therefore associated with relatively high use of time and computational resources, even when scheduling only those jobs associated with rendering a single frame from a gaming or other application. Heuristic approaches do not typically solve the scheduling problem in an optimal manner.

Embodiments of systems and techniques described herein utilize reinforcement learning to evaluate and operate on a shader sequence or shader graph to more efficiently schedule shader jobs, such as based on one or more reward metrics selected as a reinforcement learning parameter for evaluating an initial sequence of shader jobs (and/or for evaluating one or more iteratively modified sequences of shader jobs). In this manner, embodiments utilize artificial one or more neural networks trained via reinforcement learning, such that the neural network may learn to select criteria for optimizing a sequence of shader jobs by quantifying complex relationships and thereby improve frame rendering performance without the high computational resources associated with a factorially complex exhaustive search or with suboptimal heuristic approaches.

In certain embodiments, a sequence of shader jobs or other execution jobs may be modified based on a policy associated with an application that has generated one or more target frames for rendering. The policy may include, for example, one or more weights for an artificial neural network that is coupled to or forms part of a rendering pipeline scheduler (RPS), such that weights indicated by the policy may be optimized over one or more iterative evaluations of a reordered sequence based on one or more reward metrics.

It will be appreciated that although various embodiments of described techniques may be discussed herein with respect to graphical shader jobs in the context of rendering one or more frames of a gaming application, such techniques are applicable to general executable job (also termed "execution job") scheduling in various other contexts, including execution job scheduling in any threaded and/or multithreaded execution environment (e.g., scheduling tensor operations) using the guidelines provided herein.

In the process of rendering frames for a video game application, a majority of rendering resources go through only a few state transitions per frame. Moreover, these state transitions can usually be resolved within a localized confined scope. Typically, an individual rendering command sequence for each of those frames is largely coherent when considered frame-to-frame (even more so if geometry passes are excluded from such consideration), indicating that the same renderer code typically runs over and over again with the same or similar control flow in each of multiple frames to be rendered. Thus, in certain embodiments the selected reward metric(s) may include a quantity of state transitions associated with rendering a target frame.

FIG. 1 illustrates a series of pseudo-instructions 105 for preparing a cake. The pseudo-instructions generally provide executable steps for preparing the cake (e.g., enabling or turning on the oven, greasing a tray with butter, adding ingredients to a bowl, etc.). The pseudo-instructions also illustrate the concept of dependencies, in the sense that while the series of pseudo-instructions 105 may be reordered to some degree, some steps will necessarily precede others. For example, while there may be nothing to prevent adding eggs to the bowl before adding the butter to the bowl, neither of those steps may proceed without first acquiring the bowl. Therefore, any reordering must accommodate this dependency—any execution of the step of adding eggs to the bowl is dependent on first having the outcome of the step of acquiring the bowl.

Figure 2:
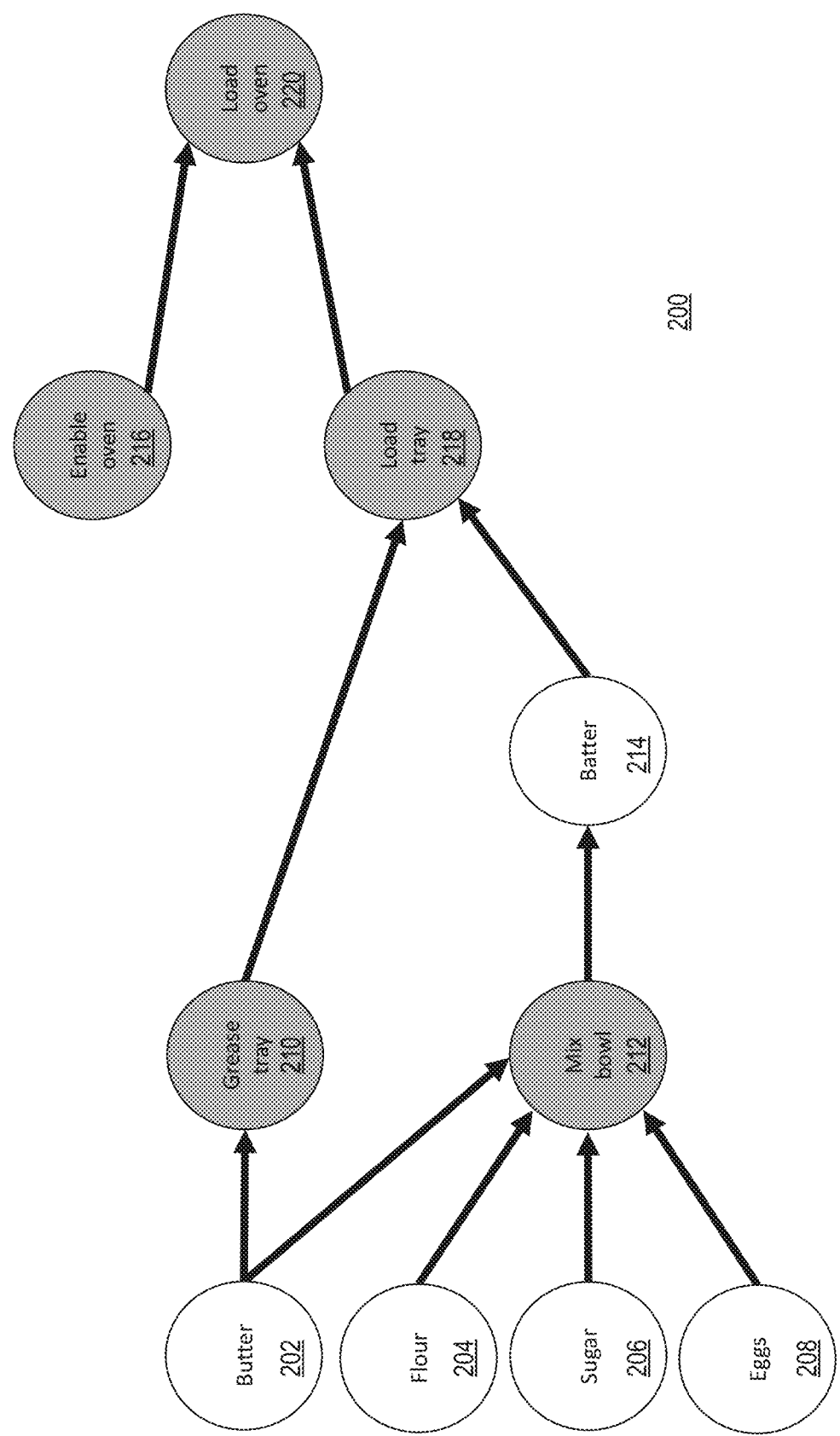
FIG. 2 illustrates a series of pseudo-instructions as a render graph in accordance with one or more embodiments.

FIG. 2 expresses the series of pseudo-instructions 105 of FIG. 1 as a render graph 200. Each node of the render graph 200 represents an action and/or an input to an action. For example, butter 202 is utilized as an input for the "grease tray" step 210 and "mix bowl" step 212; flour 204, sugar 206, and eggs 208 are all additional inputs for the "mix bowl" 212 step. The generated result of the "mix bowl" step 212 is batter 214, which in turn is used as an input (along with the result of "grease tray" step 210) for a "load tray" step 218. The respective results of the "enable oven" step 216 and "load tray" step 218 are used as inputs for "load oven" step 220.

Figure 3:
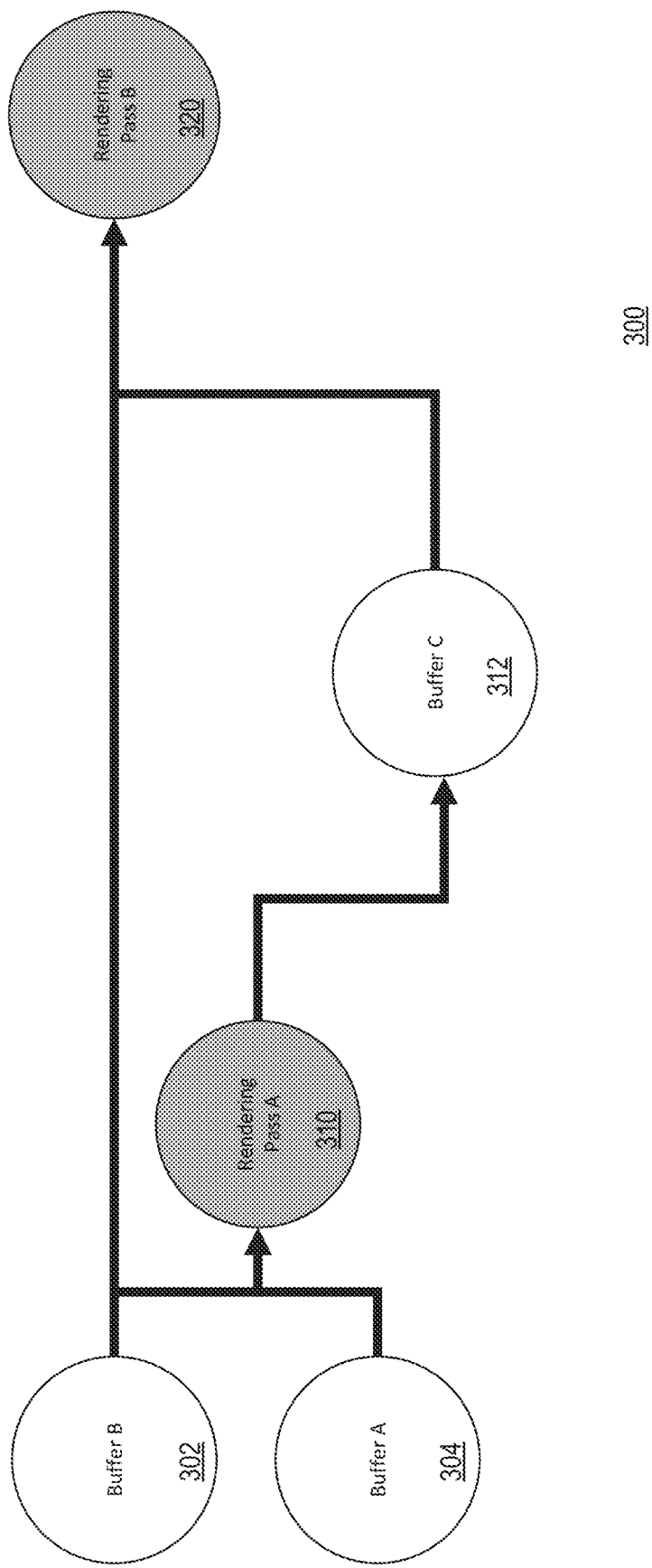
FIG. 3 illustrates an additional series of pseudo-instructions as a render graph in accordance with one or more embodiments.

FIG. 3 provides an additional example of a render graph 300. In this example, the contents of buffer B 302 and the contents of buffer A 304 are used as inputs to a rendering pass A 310. The result of rendering pass A 310 is stored in a buffer C 312, the contents of which are then used as an input (along with the contents of buffer B 302) as inputs to a rendering pass B 320. As can be seen from this arrangement, rendering pass A 310 is a data dependency for rendering pass B 320. Generally, a data dependency for an instruction may be considered to be input needed for correct execution of that instruction, and/or one or more other instructions that generate or store that needed input.

In certain embodiments, a rendering pipeline scheduler (RPS) may accept as input an initial sequence of shader jobs, from which it may infer data dependencies associated with each of those shader jobs. In various circumstances and embodiments, the RPS may also accept as input an initial sequence of shader jobs in the form of a render graph (such as render graph 400), with such data dependencies explicitly delineated. In addition, in certain embodiments, an RPS may at least partially parse a provided sequence of shader jobs by generating a render graph of some or all of the shader jobs included in the provided sequence.

Figure 4:
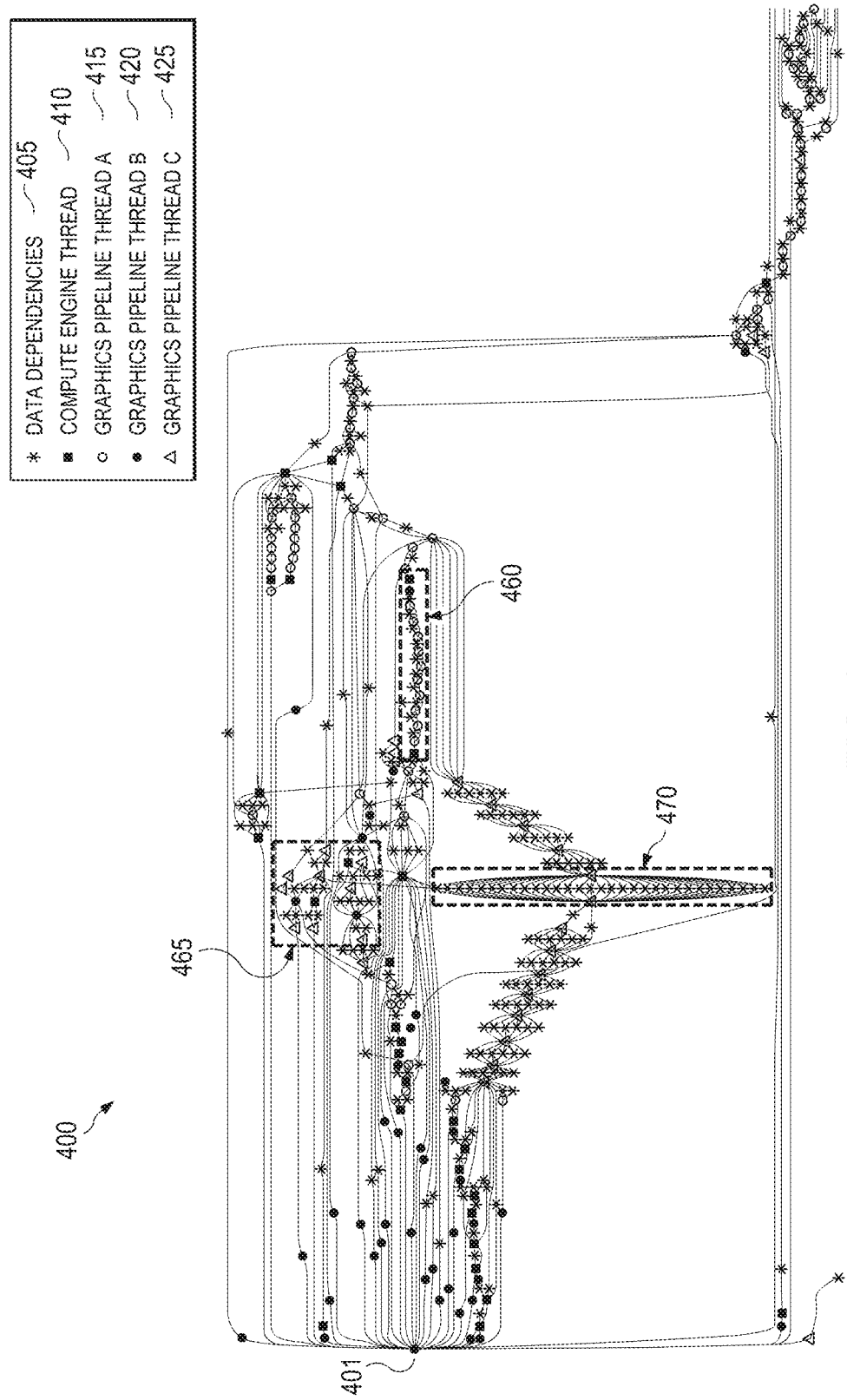
FIG. 4 illustrates an additional series of pseudo-instructions as a render graph in accordance with one or more embodiments.

FIG. 4 depicts a more realistic render graph 400 that illustrates one possible arrangement of flow and data dependencies for rendering (as a non-limiting example) a single frame of output of a gaming application. It will be appreciated that the additional complexity of render graph 400 over that of render graph 300 in FIG. 3 corresponds to an exponential increase in the complexity of job scheduling for each node of the render graph. The render graph 400 may have been generated by an RPS based on a provided shader job list for input, or provided to the RPS as the shader job list for input. In the depicted embodiment, the nodes of the render graph represent operations and data dependencies associated with multiple processing threads, beginning with an initial node 401. In particular, the render graph 400 indicates a quantity of shader job nodes that are associated with multiple shader jobs (each including a set of executable instructions) assigned to an RPS for scheduling execution by one or more of a compute engine thread 410, a graphics engine thread A 415, a graphics engine thread B 420, and a graphics engine thread C 425. In the depicted embodiment, the compute engine thread 410 represents a sequence of shader jobs to be executed in turn by one or more compute units of a compute engine (such as a compute engine of a central processing unit (CPU) or other processor); each of the graphics engine threads 415, 420, 425 respectively represents a sequence of shader jobs to be executed in turn by a distinct processing pipeline of a graphics processing unit (GPU). It will be appreciated that in various embodiments, the RPS may reorder shader jobs and associated sequences of executable instructions among and between greater or fewer quantities of available compute units, processor cores, graphics engines, processing pipelines, etc.

Render graph 400 also includes data dependency nodes 405, which are typically buffers and/or textures that are passed between individual shader job nodes. In various scenarios and embodiments, data dependency nodes expressed in an RPS render graph may represent different types of data dependencies, such as one or more tensors, matrices, multidimensional arrays, etc. For execution correctness to be preserved, these data dependencies cannot be broken, but as long as the data dependencies are accommodated, the additional scope and complexity of the render graph 400 provides for greater flexibility in reorganizing (reordering) than did the nodes of, e.g., render graph 300 in FIG. 3. In the depicted example, data dependency nodes 405 may be expressed as a quantity of serial dependencies, such as in portion 460 of the render graph 400, as a quantity of parallel dependencies, such as in portion 470 of the render graph, or as a quantity of mixed serial and parallel dependencies, such as in portion 465 of the render graph. It will be appreciated that in various scenarios and embodiments, a render graph associated with one or more set of executable instructions may include and accommodate a variety of data dependencies expressed serially and/or in parallel, and that the render graph 400 is merely illustrative.

Figure 5:
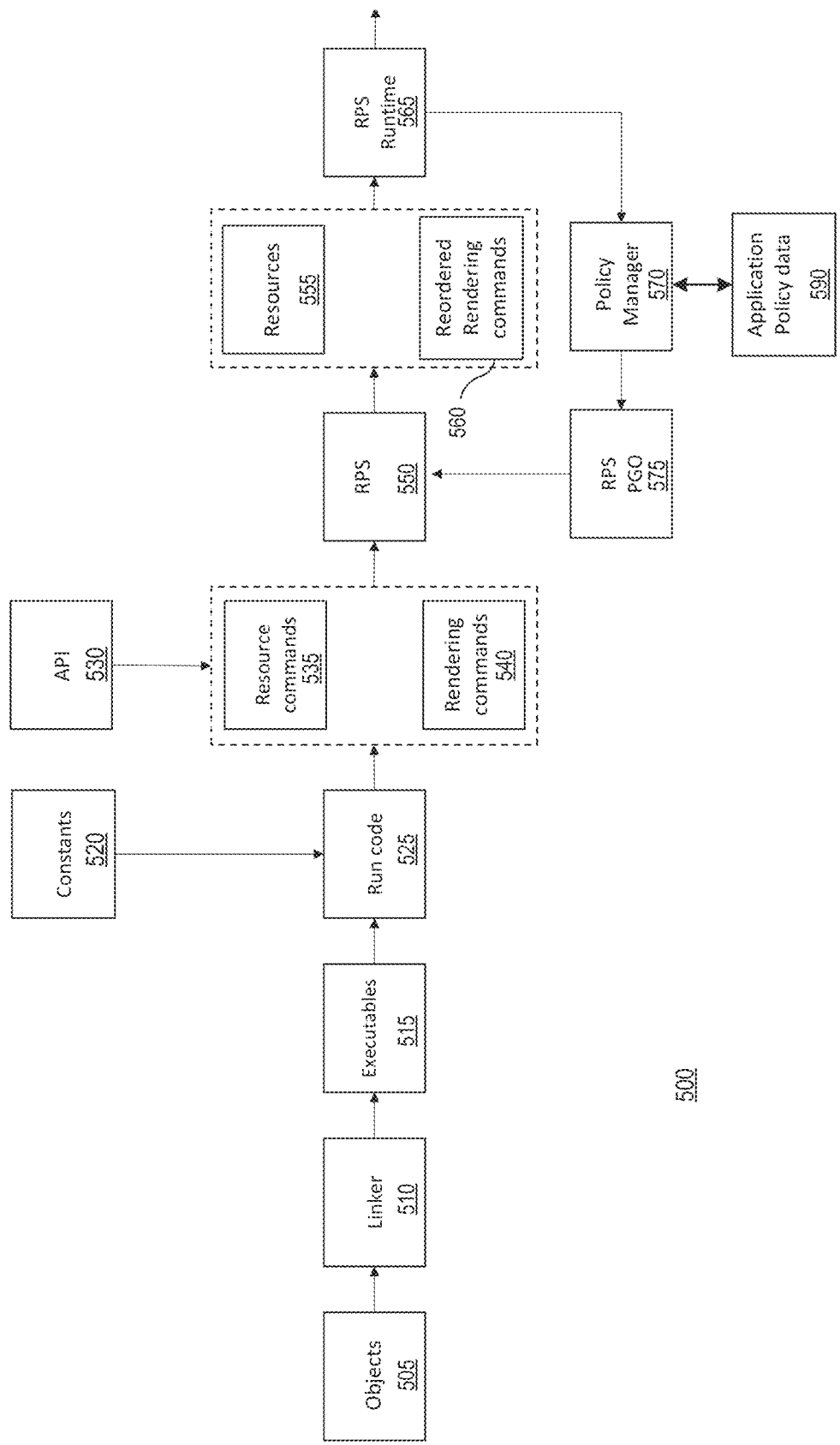
FIG. 5 is a block diagram illustrating portions of a processing system that includes a rendering pipeline scheduler implemented in accordance with one or more embodiments.

FIG. 5 is a block diagram illustrating portions of a processing system 500 that includes a rendering pipeline scheduler (RPS) 550 in accordance with certain embodiments. In particular, the processing system 500 includes a series of pre-scheduling compiler blocks (objects 505, linker 510, and executables 515) that are used along with constants 520 to generate run code 525. An application programming interface (API) 530 is utilized to separate the run code 525 into resource commands 535 and rendering commands 540, respectively, prior to providing the resource commands and rendering commands to an RPS scheduler 550. In certain embodiments, the run code 525 may be provided as input directly to the RPS scheduler 550, which may operate on the run code 525 either with or without separating the run code into resource commands and render commands.

In the depicted embodiment, the RPS 550 provides a separated output of resources 555 and reordered rendering commands 560. As described elsewhere herein, such reordered render commands 560 may effectuate an attempt by the RPS 550 to improve (as compared to the sequence of render commands 540 initially provided to the RPS 550) the rendering of one or more target frames with respect to one or more selected reward metrics. The resources 555 and reordered rendering commands 560 together comprise the RPS runtime code 565, which in at least some embodiments forms a modified (reordered) sequence of the execution jobs initially provided to the RPS 550 via run code 525.

In various embodiments, generating the modified sequence of RPS runtime code 565 includes generating an iterative modified sequence of execution jobs via reinforcement learning based at least in part on the evaluating of the modified sequence with respect to one or more selected reward metrics. In some embodiments, the selected reward metrics may be selected from a plurality of statistical and/or performance metrics associated with rendering one or more previous frames of a frame sequence that includes a current target frame. Non-limiting examples of such statistical and/or performance metrics include rendering time of the one or more previous frames; a quantity of compute barriers encountered during rendering of the one or more previous frames; a quantity of state transitions associated with the rendering of the one or more previous frames; and other suitable rendering performance metrics. Thus, initiating execution of the RPS runtime 565 includes initiating execution of the iterative modified sequence of execution jobs.

In the depicted embodiment of FIG. 5, the processing system 500 includes a policy manager 570, such as to determine whether a stored policy exists that is associated with the application generating the frame or frames to be scheduled for rendering by RPS 550. If so, the policy manager 570 retrieves the appropriate associated policy from application policy data 590, which may be stored in one or more memories (not shown) of the processing system 500. (Referring to one embodiment discussed herein with respect to FIG. 7, associated application policies may be stored as part of main memory 704, by mass storage 716, and/or as part of instructions 724.) In addition to retrieving and providing an associated policy, in certain embodiments the policy manager 570 may handle generating, modifying, and/or storing (such as within the application policy data 590) an updated version of an application policy based on one or more modified sequences of execution jobs generated by RPS 550, such as if those modified sequences have become associated with improved values for reward metrics selected for use in evaluating aspects of rendering the current target frame.

As non-limiting examples, the stored policy may include information regarding specified data dependencies of the execution job sequence; information regarding one or more identified compute barriers (e.g., a pipeline stall, or other scenario in which an execution job is forced to wait during execution until one or more of its data dependencies are resolved) associated with rendering frames of the frame application, such as may indicate to reorder the execution job sequence in a manner intended to alleviate or eliminate such identified compute barriers; information indicative of one or more weights for one or more artificial neural networks; information indicative of one or more parameters for input and/or output transforms (e.g., power transforms, logarithm transforms, etc.) in order to support a machine learning process; information indicative of one or more parameters for alternative machine learning models such as Markov decision trees, random forest, and/or genetic algorithms; and other information. In certain embodiments, a stored policy may be associated with the frame application based on an explicit association with the identified frame application, or based on one or more similarities of the frame application with other applications—e.g., if the frame application utilizes an identified graphics engine used in other applications with associated stored policies.

Policy manager 570 provides the associated policy to RPS profile-guided optimization manager 575, which in the depicted embodiment may select one or more reward metrics for evaluating a job sequence for rendering the current target frame based on information contained in the associated policy. In addition, in certain embodiments the RPS profile-guided optimization manager 575

Figure 6:
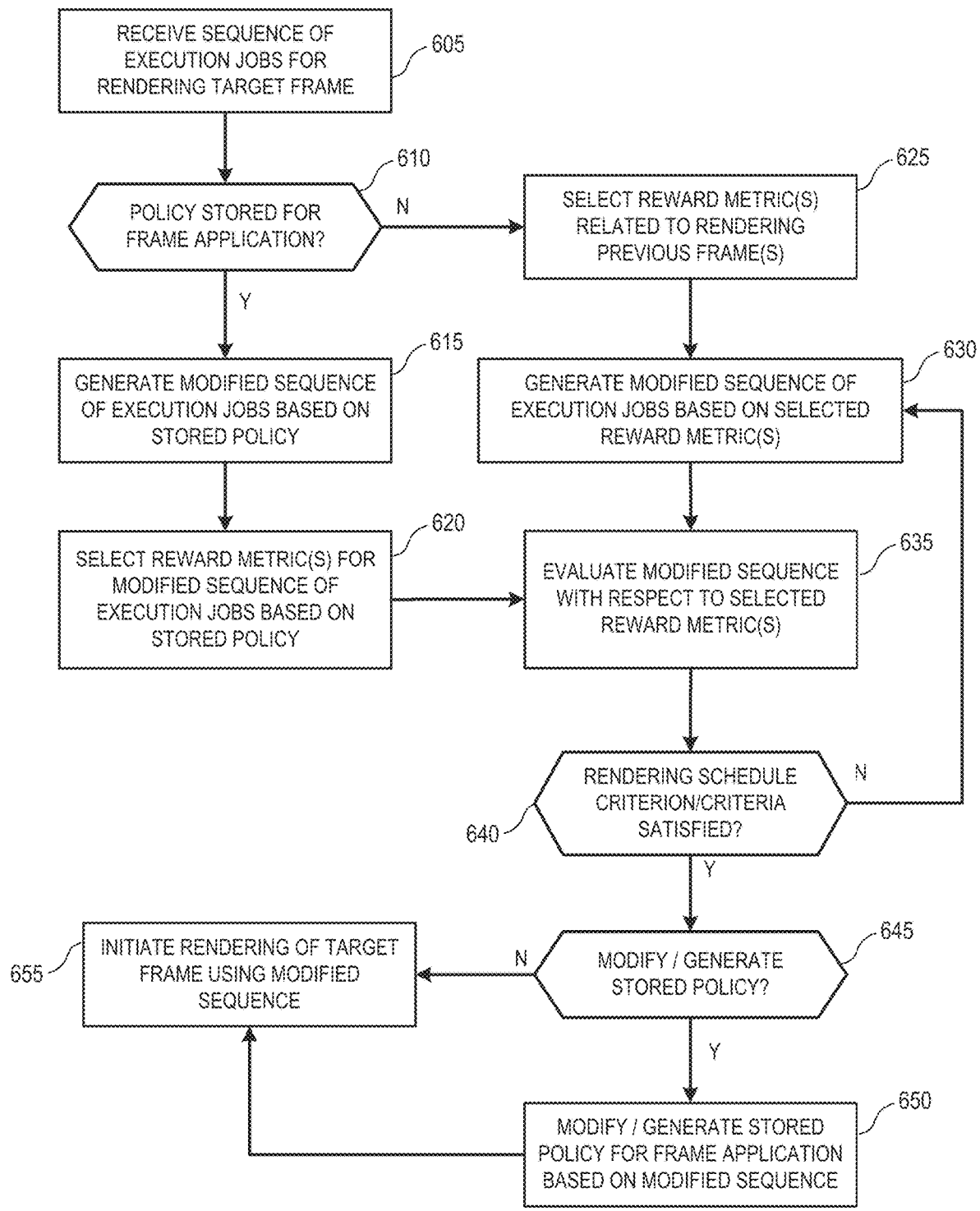
FIG. 6 is a block diagram illustrating an overview of an operational routine of a rendering pipeline scheduler in accordance with one or more embodiments.

FIG. 6 is a block diagram illustrating an overview of an operational routine of a rendering pipeline scheduler (such as RPS 550 of FIG. 5) in accordance with one or more embodiments. The routine begins at block 605, in which the scheduler receives a sequence of execution jobs related to rendering a target frame, which in at least some embodiments is generated by a gaming or other application for rendering (the frame application) as part of a frame sequence. In certain embodiments, the scheduler may receive the sequence of execution jobs as a list of executable instructions that are each associated with one of the execution jobs, from which the scheduler may infer one or more data dependencies associated with the received sequence; the scheduler may instead receive the sequence of execution jobs as a render graph, with such data dependencies already delineated. The routine proceeds to block 610.

At block 610, the scheduler determines whether there is a stored policy associated with the frame application. In various embodiments, the stored policy may be provided by a developer of the frame application, or by some other source; stored locally (e.g., as part of one or more video drivers accessible by the scheduler) or remotely (e.g., via one or more networks); and/or created or modified based on one or more previous rendering operations. If the scheduler determines that there is a stored policy associated with the frame application, the routine proceeds to block 615.

At block 615, the scheduler generates a modified sequence of execution jobs based on the stored policy, which may include various criteria related to rendering frames generated by the associated frame application. For example, in certain embodiments the scheduler may generate the modified sequence using a machine learning artificial neural network, for which one or more network weights are indicated by the stored policy. The routine proceeds to block 620.

At block 620, the scheduler selects one or more reward metrics for use in evaluating a reordered execution job sequence based at least in part on the associated stored policy. As noted above, the reward metrics may be selected from a pool of statistical or other performance metrics associated with such rendering, such as (as non-limiting examples): rendering time of the one or more previous frames; a quantity of compute barriers encountered during rendering of the one or more previous frames; a quantity of state transitions associated with the rendering of the one or more previous frames; or other suitable performance metrics. Thus, in certain embodiments the scheduler may track (or initiate tracking of) such statistical or other performance metrics as part of rendering some or all frames and/or frame sequences. Statistical or other performance metric(s) selected for use as a reward metric may be directly tracked, or may be derived from other tracked metrics—for example, a reward metric calculated as a time difference between the rendering of the target frame and a rendering of one or more previous frames.

If it was determined in block 610 that there was not a stored policy associated with the frame application that generated the target frame, the routine proceeds to block 625, in which the scheduler selects one or more reward metrics related to rendering one or more previous frames in a frame sequence of the target frame. In certain embodiments, in the absence of a stored policy associated with the frame application the scheduler may select the reward metric(s) to use based on various criteria, including any information regarding the frame application (e.g., an indication that the frame application is similar to one or more additional applications, such as by using an identified graphics engine that is also used by the frame application). In certain embodiments, selecting the reward metrics may include generating one or more random or pseudo-random neural network weights to effectively create a new policy with which to evaluate a reordered version of the sequence of execution jobs. The routine proceeds to block 630.

At block 630, the scheduler generates a modified sequence of execution jobs based on the one or more selected reward metrics. In various embodiments and circumstances, the scheduler may, for example, determine to reorder the sequence of execution jobs in a manner intended to reduce compute barriers encountered during the rendering process by moving one or more execution jobs in the sequence to an earlier or later position based on a volume of data dependencies associated with those execution jobs. The routine proceeds to block 635.

At block 635, the scheduler evaluates the modified sequence with respect to the one or more reward metrics that were selected either in block 620 (if it was determined in block 610 that there was a stored policy associated with the frame application) or in block 625 (if it was determined in block 610 that there was no such stored policy). In at least some embodiments, evaluating the modified sequence may include simulating a rendering of the target frame using the modified sequence of execution jobs, such as to determine if the reward metrics resulting from the modified sequence have improved e.g., whether a simulated rendering time for the target frame has been reduced, whether a quantity of compute barriers and/or state transitions associated with the simulated rendering of the target frame has been reduced, etc. After evaluating the modified sequence of execution jobs, the routine proceeds to block 640.

At block 640, the scheduler determines whether one or more criteria for modifying the sequence of execution jobs have been satisfied. For example, in certain embodiments the scheduler may determine whether a limit on rendering passes (or simulated rendering passes) has been met or exceeded. In such embodiments, such a limit on rendering or simulated rendering passes may be defined as a quantity (e.g., ten passes), as a time value (such as to ensure that the rendering of the target frame is performed within an amount of time sufficient to maintain a target frame rate for rendering the frame sequence), or in some other manner. In certain embodiments and scenarios, the criteria for modifying the sequence of execution jobs may include a threshold improvement for the one or more selected reward metrics. For example, in certain embodiments the criteria may be deemed satisfied if the rendering time of the target frame has been improved by a certain amount (e.g., ten percent).

If it is determined in block 640 that the one or more criteria for modifying the sequence of execution jobs have not yet been satisfied, the routine returns to block 630 to further modify the sequence of execution jobs. In at least some embodiments, the scheduler may base additional modifications to the sequence on the evaluation of the earlier modified sequence with respect to the selected reward metrics, such as to modify the sequence of execution jobs in a manner similar to that used for the first modified sequence if the reward metrics improved, or to modify the sequence of execution jobs in other manners if the reward metrics did not improve.

If it is determined in block 640 that the one or more criteria for modifying the sequence of execution jobs has been satisfied, the routine proceeds to block 645, in which the scheduler determines whether to modify an existing stored policy for the frame application based on the evaluating of the modified sequence of execution jobs (such as if it was determined in block 610 that there was a stored policy associated with the frame application). In certain embodiments, the scheduler may determine to generate and store a new policy associated with the frame application (such as if it was determined in block 610 that there was no such stored policy). If it is determined in block 645 to modify or generate a policy stored in association with the frame application, the routine proceeds to block 650 to do so.

After block 650, or if it was determined in block 645 to not modify or generate a policy associated with the frame application, the routine proceeds to block 655, in which the scheduler initiates a rendering of the target frame using the modified sequence of execution jobs.

Figure 7:
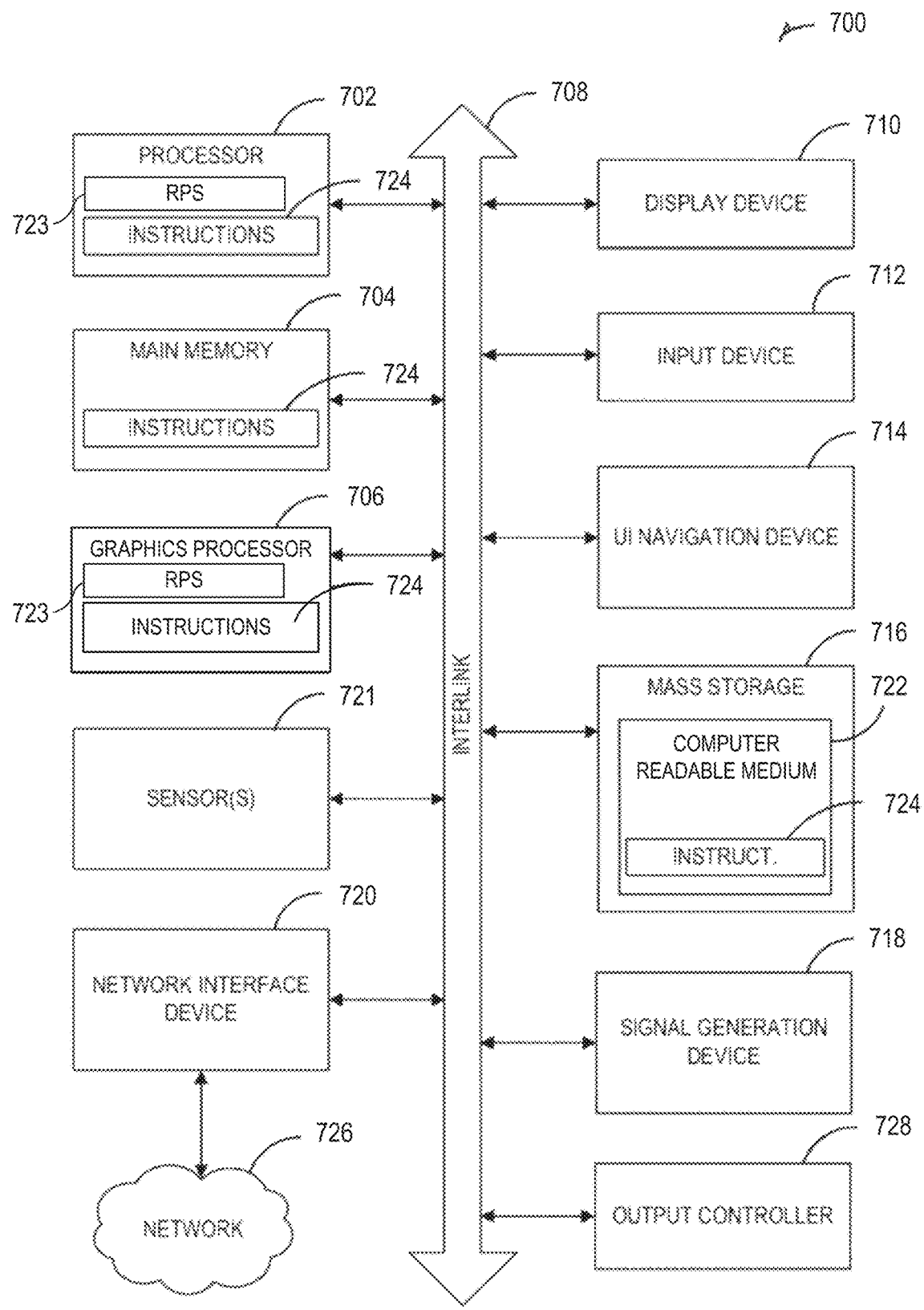
FIG. 7 is a component-level block diagram illustrating an example of a computing system in accordance with one or more embodiments.

FIG. 7 is a component-level block diagram illustrating an example of a computing system 700 suitable for implementing one or more embodiments. In alternative embodiments, the computing system 700 may operate as a standalone device or may be connected (e.g., networked) to other systems. In various embodiments, one or more components of the computing system 700 may be incorporated as or within one or more server computing systems to provide various types of game application output or other content. It will be appreciated that an associated server computing device may include some components of computing system 700, but not necessarily all of them. In a networked deployment, the computing system 700 may operate in the capacity of a server machine, a client machine, or both in server-client network environments. In at least one example, the computing system 700 may act as a peer system in peer-to-peer (P2P) (or other distributed) network environment. The computing system 700 may be a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The computing system 700 may include one or more hardware processors 702 (e.g., a central processing unit (CPU), a hardware processor core, or any combination thereof), a main memory 704, and a graphics processing unit (GPU) 706, some or all of which may communicate with each other via an interlink (e.g., bus) 708. The computing system 700 may further include a display unit 710 (such as a display monitor or other display device), an alphanumeric input device 712 (e.g., a keyboard or other physical or touch-based actuators), and a user interface (UI) navigation device 714 (e.g., a mouse or other pointing device, such as a touch-based interface). In one example, the display unit 710, input device 712, and UI navigation device 714 may comprise a touch screen display. The computing system 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The computing system 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a computer-readable medium 722 on which is stored one or more sets of data structures or instructions 724 (e.g., software) embodying or utilized by any one or more of the techniques or functions described herein. The instructions 724 may also reside, completely or at least partially, within the main memory 704, within GPU 706, or within the hardware processor 702 during execution thereof by the computing system 700. In an example, one or any combination of the hardware processor 702, the main memory 704, the GPU 706, or the storage device 716 may constitute computer-readable media. In addition, in the depicted embodiment one or both of the hardware processor 702 and GPU 706 may include an implementation of an RPS unit 723, such as to facilitate efficient threaded execution of one or more execution jobs across one or more processing threads.

While the computer-readable medium 722 is illustrated as a single medium, the term "computer-readable medium" may include a single medium or multiple media (e.g., a centralized or distributed database, and/or associated caches and servers) configured to store the one or more instructions 724.

The term "computer-readable medium" may include any medium that is capable of storing, encoding, or carrying instructions for execution by the computing system 700 and that cause the computing system 700 to perform any one or more of the techniques of the present disclosure, or that is capable of storing, encoding or carrying data structures used by or associated with such instructions. Non-limiting computer-readable medium examples may include solid-state memories, and optical and magnetic media. In an example, a massed computer-readable medium comprises a computer-readable medium with a plurality of particles having invariant (e.g., rest) mass. Accordingly, massed computer-readable media are not transitory propagating signals. Specific examples of massed computer-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the computing system 700, and includes digital or analog communications signals or other intangible medium to facilitate communication of such software.

In some embodiments, the apparatus and techniques described above are implemented in a system including one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving a first sequence of execution jobs associated with rendering a target frame of a sequence of frames;
    generating a modified sequence of execution jobs for rendering the target frame based on the first sequence of execution jobs;
    evaluating the modified sequence with respect to the one or more selected reward metrics; and
    based at least in part on the evaluating of the modified sequence, initiating rendering of the target frame using the modified sequence of execution jobs.

2. The method of claim 1, further comprising:
    retrieving a stored policy associated with an application generating the sequence of frames; and
    selecting the one or more reward metrics based at least in part on the stored policy.

3. The method of claim 2, further comprising:
    modifying the stored policy associated with the application based at least in part on the evaluating of the modified sequence.

4. The method of claim 1, further comprising selecting the one or more reward metrics based at least in part on a rendering of one or more previous frames of the sequence of frames.

5. The method of claim 1, further comprising selecting the one or more reward metrics from a plurality of tracked performance metrics related to rendering the target frame.

6. The method of claim 1, wherein the one or more selected reward metrics include one or more of:
    a time to render the target frame;
    a time difference between rendering the target frame and rendering one or more previous frames of the sequence of frames;
    a quantity of state transitions associated with rendering the target frame; or
    a quantity of compute barriers associated with the rendering of the target frame.

7. The method of claim 1, wherein generating the modified sequence of execution jobs includes generating a render graph representation of the first sequence of execution jobs.

8. The method of claim 7, wherein generating the render graph representation of the first sequence of execution jobs includes inferring one or more data dependencies from the first sequence of execution jobs.

9. The method of claim 1, wherein receiving the first sequence of execution jobs includes receiving a render graph representation of the first sequence of execution jobs.

10. The method of claim 1, wherein generating the modified sequence includes generating an iterative modified sequence of execution jobs via reinforcement learning based at least in part on the evaluating of the modified sequence, and wherein initiating execution of the modified sequence includes initiating execution of the iterative modified sequence.

11. A processing system, comprising:
    one or more processors, each processor having one or more processing cores;
    one or more memories coupled to the one or more processors; and
    at least one rendering pipeline scheduler coupled to the one or more processors, to:
        receive a first sequence of execution jobs associated with rendering a target frame of a sequence of frames;

generate a modified sequence of execution jobs for rendering the target frame, based on the first sequence of execution jobs;

evaluate the modified sequence with respect to one or more selected reward metrics; and initiate rendering of the target frame using the modified sequence of execution jobs based at least in part on the evaluation of the modified sequence.

12. The processing system of claim 11, wherein the at least one rendering pipeline scheduler is further to retrieve a stored policy associated with an application generating the sequence of frames, and to select the one or more reward metrics based at least in part on the stored policy.

13. The processing system of claim 12, wherein the at least one rendering pipeline scheduler is further to modify the stored policy associated with the application based at least in part on the evaluation of the modified sequence with respect to the one or more selected reward metrics.

14. The processing system of claim 11, wherein the at least one rendering pipeline scheduler is to select the one or more reward metrics based at least in part on a rendering of one or more previous frames of the sequence of frames.

15. The processing system of claim 11, wherein the at least one rendering pipeline scheduler is to select the one or more reward metrics from a plurality of tracked performance metrics related to rendering the target frame.

16. The processing system of claim 11, wherein the one or more selected reward metrics include one or more of:
a time to render the target frame;
a time difference between rendering the target frame and rendering one or more previous frames of the sequence of frames;
a quantity of state transitions associated with rendering the target frame; or
a quantity of compute barriers associated with the rendering of the target frame.

17. The processing system of claim 11, wherein to generate the modified sequence of execution jobs includes to generate a render graph representation of the first sequence of execution jobs.

18. The processing system of claim 17, wherein to generate the render graph representation of the first sequence of execution jobs includes to infer one or more data dependencies from the first sequence of execution jobs.

19. The processing system of claim 11, wherein to receive the first sequence of execution jobs includes to receive a render graph representation of the first sequence of execution jobs.

20. The processing system of claim 11, wherein the at least one rendering pipeline scheduler includes reinforcement learning to generate an iterative modified sequence of execution jobs based at least in part on the evaluation of the modified sequence with respect to the one or more selected reward metrics, and wherein to initiate execution of the modified sequence of execution jobs includes to initiate execution of the iterative modified sequence.

21. A non-transitory computer-readable medium storing instructions that, when executed, cause one or more hardware processors to:

receive a first sequence of execution jobs associated with rendering a target frame;

generate a modified sequence of execution jobs for rendering the target frame based on the first sequence of execution jobs;

evaluate the modified sequence with respect to one or more selected reward metrics; and based at least in part on the evaluation of the modified sequence, initiate execution of the modified sequence of execution jobs to render the target frame.

22. The non-transitory computer-readable medium of claim 21, wherein the stored instructions further cause the one or more hardware processors to retrieve a stored policy associated with an application generating the target frame, and to select the one or more reward metrics based at least in part on the stored policy.

* * * * *